United States Patent
Craine et al.

(10) Patent No.: US 10,832,231 B2
(45) Date of Patent: *Nov. 10, 2020

(54) POINT-OF-SALE CUSTOMIZATION SERVICE

(71) Applicant: AT&T Intellectual Property I, L.P., Atlanta, GA (US)

(72) Inventors: Ari Craine, Marietta, GA (US); James H. Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/556,346

(22) Filed: Aug. 30, 2019

(65) Prior Publication Data
US 2019/0385138 A1    Dec. 19, 2019

Related U.S. Application Data

(63) Continuation of application No. 15/430,808, filed on Feb. 13, 2017, now Pat. No. 10,402,805, which is a continuation of application No. 14/548,611, filed on Nov. 20, 2014, now Pat. No. 9,569,764.

(51) Int. Cl.
| | |
|---|---|
| *G06Q 20/00* | (2012.01) |
| *G06Q 20/20* | (2012.01) |
| *G06Q 20/32* | (2012.01) |
| *G06Q 20/40* | (2012.01) |

(52) U.S. Cl.
CPC ......... *G06Q 20/20* (2013.01); *G06Q 20/3278* (2013.01); *G06Q 20/401* (2013.01)

(58) Field of Classification Search
CPC ... G06Q 20/20; G06Q 20/3278; G06Q 20/401
USPC ........................................................ 235/379
See application file for complete search history.

(56) References Cited

U.S. PATENT DOCUMENTS

| | | | |
|---|---|---|---|
| 6,649,471 B2 | 11/2003 | Cho et al. | |
| 7,828,208 B2 | 11/2010 | Gangi | |
| 7,980,466 B2 | 7/2011 | Lee et al. | |
| 8,078,507 B1 | 12/2011 | Rao | |
| 8,811,892 B2 | 8/2014 | Khan et al. | |
| 8,831,642 B2 | 9/2014 | Moldaysky et al. | |
| 10,402,805 B2 * | 9/2019 | Craine | G06Q 20/3278 |

(Continued)

FOREIGN PATENT DOCUMENTS

KR        101397176      5/2014

OTHER PUBLICATIONS

U.S. Office Action dated Jan. 7, 2016 in U.S. Appl. No. 14/548,611.

(Continued)

*Primary Examiner* — Daniel A Hess
(74) *Attorney, Agent, or Firm* — Hartman & Citrin LLC

(57) ABSTRACT

Concepts and technologies are disclosed herein for point-of-sale customization service. A processor executing a point-of-sale customization service can receive a unique identifier associated with a user device detected in a proximity of a computing device. The processor can query preferences stored in a data store using the unique identifier and identify point-of-sale preferences associated with the user device based upon the querying. The processor can transmit the point-of-sale preferences to the computing device to apply to a transaction.

20 Claims, 8 Drawing Sheets

(56) References Cited

U.S. PATENT DOCUMENTS

| | | |
|---|---|---|
| 2005/0045718 A1 | 3/2005 | Bortolin |
| 2006/0038004 A1 | 2/2006 | Rielly |
| 2008/0183588 A1 | 7/2008 | Agrawal |
| 2009/0063285 A1 | 3/2009 | Ablowitz |
| 2009/0171799 A1 | 7/2009 | Ying |
| 2012/0005023 A1 | 1/2012 | Graff |
| 2012/0130821 A1 | 5/2012 | Frankel et al. |
| 2014/0012701 A1* | 1/2014 | Wall .................. G06Q 20/3224 705/26.8 |
| 2014/0122328 A1 | 5/2014 | Grigg |
| 2014/0129435 A1 | 5/2014 | Pardo et al. |
| 2014/0191041 A1 | 7/2014 | Zhao et al. |
| 2014/0207669 A1 | 7/2014 | Rosenberg |

OTHER PUBLICATIONS

U.S. Office Action dated May 24, 2016 in U.S. Appl. No. 14/548,611.
U.S. Notice of Allowance dated Sep. 27, 2016 in U.S. Appl. No. 14/548,611.
U.S. Office Action dated Sep. 28, 2017 in U.S. Appl. No. 15/430,808.
U.S. Office Action dated Apr. 2, 2018 in U.S. Appl. No. 15/430,808.
U.S. Office Action dated Aug. 29, 2018 in U.S. Appl. No. 15/430,808.
U.S. Office Action dated Feb. 1, 2019 in U.S. Appl. No. 15/430,808.
U.S. Notice of Allowance dated Apr. 15, 2019 in U.S. Appl. No. 15/430,808.

* cited by examiner

POINT-OF-SALE CUSTOMIZATION SERVICE

CROSS-REFERENCE TO RELATED APPLICATIONS

This application is a continuation of and claims priority to U.S. patent application Ser. No. 15/430,808, entitled "Point-Of-Sale Customization Service," filed Feb. 13, 2017, now U.S. Pat. No. 10,402,805, which is incorporated herein by reference in its entirety; and which is a continuation of and claims priority to U.S. patent application Ser. No. 14/548,611, entitled "Point-Of-Sale Customization Service," filed Nov. 20, 2014, now U.S. Pat. No. 9,569,764, which is incorporated herein by reference in its entirety.

BACKGROUND

According to some statistics, about sixty percent of all transactions for goods and services are completed using non-cash sources of funds. For a majority of retailers who complete these transactions, these non-cash payments may be accepted using point-of-sale systems. The point-of-sale systems may support credit card transactions, electronic fund transfer, debit card transactions, and the like.

During completion of these transactions, purchasers may interact with a point-of-sale system or terminal to complete the transaction. These point-of-sale systems can provide instructions to a purchaser to guide the purchaser through the payment process and/or tailor the customer experience based upon feedback from the purchaser. For example, some point-of-sale devices or terminals may provide language choices, an option to withdraw cash from a debit card account used to pay for the goods and services, digital signature fields, combinations thereof, or the like.

Some point-of-sale devices, however, may be programmed by a manufacturer or a retailer. As such, there is not necessarily consistency among point-of-sale devices across retailers. In fact, some retail locations may have more than one type of point-of-sale device. Because of the various available point-of-sale systems and the diversity among programmers who design the customer experience associated with these point-of-sale devices, the purchasing experience at different point-of-sale devices may be different from a purchasing experience at another type of point-of-sale device. As such, purchasers may make mistakes when completing transactions and/or may be unhappy with their experiences during the purchase process.

SUMMARY

The present disclosure is directed to a point-of-sale customization service. The point-of-sale customization service can include an application, module, or other service, which can be executed by a computing device such as a server computer. The point-of-sale customization service can interface with a point-of-sale application executed by a computing device at a retail location to customize the point-of-sale experience based upon user identities, preferences, or the like. The point-of-sale customization service can store point-of-sale preferences for various users, devices, and/or accounts. The point-of-sale preferences can include, but are not limited to, unique identifiers for devices, accounts, users, or other entities. The point-of-sale preferences also can include payment method preferences, language preferences, security preferences, receipt preferences, automation preferences, privacy preferences, account information, user information, and/or other information such as reminders, profiles, or the like. According to various embodiments, the point-of-sale customization service can interact with users or other entities to allow the entities to create, update, delete and/or otherwise modify or supplement the point-of-sale preferences.

A device such as a user device can enter a proximity of a point-of-sale module, which can be connected to, a part of, and/or in communication with a computing device that hosts or executes the point-of-sale application. The point-of-sale module can detect and identify the user device, for example via communicating with the user device via a wired or wireless connection. The wired or wireless connection can be supported by various protocols and/or standards such as, for example, WiFi technologies, BLUETOOTH technologies, radio-frequency identification ("RFID") technologies, near field communication ("NFC") technologies, infrared data association ("IrDA") technologies, optical technologies, other technologies, and/or the like. Upon detecting the user device in the proximity of the point-of-sale module, the point-of-sale module or the point-of-sale application can capture a unique identifier associated with the user device such as an international mobile subscriber identity ("IMSI"), an international mobile equipment identity ("MEI"), a media access control ("MAC") address, an Internet Protocol ("IP") address, a login, a password or personal identification number ("PIN"), an email address, other identifiers, a combination thereof, or the like.

The computing device can, via execution of the point-of-sale application, transmit the identifier to the point-of-sale customization service. The point-of-sale customization service can search the point-of-sale preferences using the identifier to determine if point-of-sale preferences associated with the identifier are stored. In some embodiments, for example, the point-of-sale customization service can query the point-of-sale preferences and return point-of-sale preferences associated with the unique identifier. The point-of-sale preferences can be identified in other manners. Regardless of how the point-of-sale preferences are identified, the point-of-sale preferences associated with the identifier can be provided to the point-of-sale application.

The point-of-sale application can apply the point-of-sale preferences to a transaction occurring via the point-of-sale application and/or via a point-of-sale module associated with the point-of-sale application or a computing device that executes the point-of-sale application. Thus, the point-of-sale application and/or the point-of-sale module can apply language preferences, payment preferences, security preferences, receipt preferences, automation preferences, privacy preferences, account information, user information, other information, or the like to the transactions including pre- and/or post-transaction actions. As such, user interfaces and/or other displays can be tailored based upon point-of-sale preferences of a user or other entity. During the transaction and/or at other times, the point-of-sale module and/or the point-of-sale application also can determine if any point-of-sale preferences associated with the user device have been updated. The point-of-sale application can be configured to provide updated point-of-sale preferences, if any, to the point-of-sale customization service.

According to one aspect of the concepts and technologies disclosed herein, a method is disclosed. The method can include detecting, at a computing device including a processor, a user device in a proximity of the computing device. The method also can include determining, by the computing device, a unique identifier associated with the user device and transmitting, by the computing device, the unique identifier to a point-of-sale customization service to obtain point-of-sale preferences associated with the user device. The method also can include obtaining, by the computing device, the point-of-sale preferences from the point-of-sale customization service and applying, by the computing device, the point-of-sale preferences to a transaction associated with the user device.

In some embodiments, the method also can include determining, by the computing device, that the point-of-sale preferences were updated during the transaction and transmitting, by the computing device, the point-of-sale preferences that were updated to the point-of-sale customization service. In some embodiments, transmitting the point-of-sale preferences that were updated can include transmitting all of the point-of-sale preferences to the point-of-sale customization service. The method also can include completing, by the computing device, the transaction.

In some embodiments, detecting the user device can include detecting, via a point-of-sale module in communication with the computing device, a near field communication between the point-of-sale module and the user device. In some embodiments, the point-of-sale preferences can include a payment method preference and a language preference. In some embodiments, transmitting the unique identifier to the point-of-sale customization service can include generating a service call that requests the point-of-sale preferences and transmitting the service call with the unique identifier to the point-of-sale customization service.

According to another aspect of the concepts and technologies disclosed herein, a system is disclosed. The system can include a processor and a memory. The memory can store computer-executable instructions that, when executed by the processor, cause the processor to perform operations. The operations can include receiving, from a computing device, a unique identifier associated with a user device detected in a proximity of the computing device, identifying, by querying multiple point-of-sale preferences stored in a data store using the unique identifier, point-of-sale preferences associated with the user device, and transmitting the point-of-sale preferences associated with the user device to the computing device. The computing device can apply the point-of-sale preferences associated with the user device to a transaction associated with the user device.

In some embodiments, the computing device can include a point-of-sale module and the computing device can apply the point-of-sale preferences associated with the user device to the transaction by configuring the point-of-sale module based upon the point-of-sale preferences associated with the user device. In some embodiments, the point-of-sale preferences can include a language preference, a payment method preference, and a security preference. In some embodiments, the computing device can include a near field communication device that detects the user device by communicating with a near field communication transmitter associated with the user device. In some embodiments, the computer-executable instructions, when executed by the processor, can cause the processor to perform operations further including determining that the point-of-sale preferences associated with the user device have been updated and updating the point-of-sale preferences based upon a determined update to the point-of-sale preferences associated with the user device.

According to yet another aspect, another method is disclosed. The method can include receiving, at a processor executing a point-of-sale customization service, a unique identifier associated with a user device detected in a proximity of a computing device. The unique identifier can be received from the computing device. The method also can include querying, by the processor and based upon the unique identifier, point-of-sale preferences stored in a data store using the unique identifier. The method can also include identifying, by the processor, point-of-sale preferences associated with the user device based upon the querying and transmitting, by the processor, the point-of-sale preferences associated with the user device to the computing device to apply to a transaction associated with the user device.

In some embodiments, the method also can include determining, by the processor, that the point-of-sale preferences associated with the user device have been updated and updating, by the processor, the point-of-sale preferences based upon a determined update to the point-of-sale preferences associated with the user device. In some embodiments, receiving the unique identifier can include receiving a service call and the unique identifier from the computing device. The method also can include receiving, from the user device via interactions with the processor, user data, analyzing the user data to identify an identifier associated with the user device and a preference for the transaction, and storing the preferences at the data store. The point-of-sale preferences can include the identifier associated with the user device and the preference for the transaction. The identifier associated with the user device can include the unique identifier.

In some embodiments, the point-of-sale preferences can include identifiers, payment method preferences, language preferences, and security preferences. In some embodiments, the point-of-sale preferences can include a first profile and a second profile. In some embodiments, the first profile can include data identifying the unique identifier, a first payment method preference, a first language preference, and a first security preference, and the second profile can include the data identifying the unique identifier, a second payment method preference, a second language preference, and a second security preference. In some embodiments, transmitting the point-of-sale preferences associated with the user device to the computing device can include transmitting first point-of-sale preferences associated with the first profile and second point-of-sale preferences associated with the second profile.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
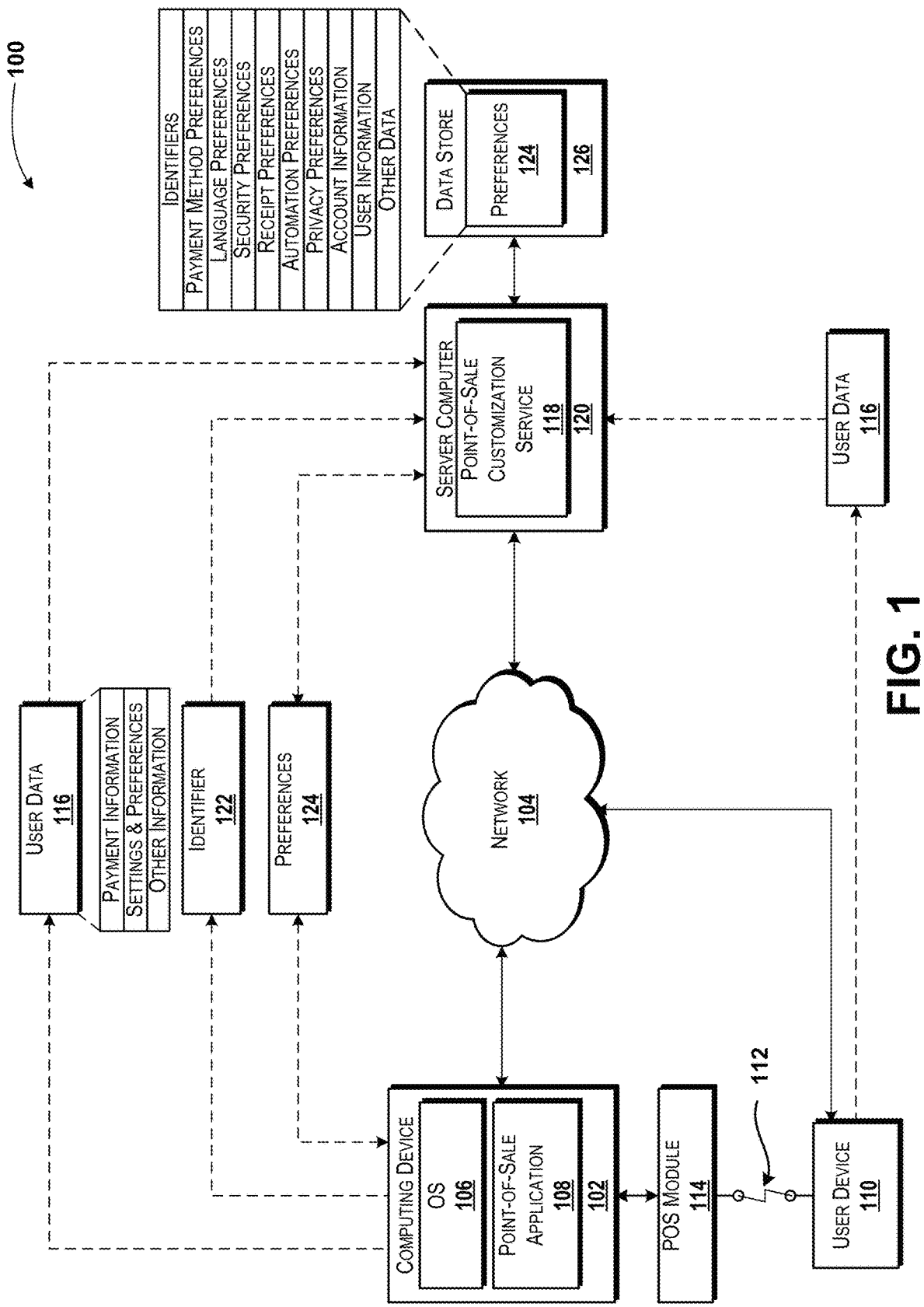
FIG. 1 is a system diagram illustrating an illustrative operating environment for various embodiments of the concepts and technologies described herein.

The following detailed description is directed to point-of-sale customization service. The point-of-sale customization service can include an application, module, or other service executed by a computing device such as a server computer. The point-of-sale customization service can interact with a point-of-sale application associated with a computing device. The point-of-sale customization service can store point-of-sale preferences ("preferences") for various users, devices, and/or accounts. The preferences can include, but are not limited to, unique identifiers for devices, accounts, users, or other entities. The preferences also can include payment method preferences, language preferences, security preferences, receipt preferences, automation preferences, privacy preferences, account information, user information, and/or other information such as reminders, profiles, or the like. A user or other entity can interact with the point-of-sale customization service to create, update, delete and/or otherwise modify or supplement the preferences.

A device such as a user device can enter a proximity of the point-of-sale module. The point-of-sale module can detect and identify the user device, for example via communicating with the user device via a wired or wireless connection, which can be supported by various protocols and/or standards such as WiFi, BLUETOOTH, RFID technologies, NFC, IrDA technologies, other optical technologies, other technologies, and/or the like. Upon detecting the user device in the proximity of the point-of-sale module, the point-of-sale module or the point-of-sale application can capture a unique identifier associated with the user device such as an IMSI, an IMEI, a MAC address, an IP address, a login, a password or PIN, an email address, a combination thereof, or the like.

The computing device can, via execution of the point-of-sale application, transmit the identifier to the point-of-sale customization service. The point-of-sale customization service can search the preferences using the identifier to determine if preferences associated with the identifier are stored. For example, the point-of-sale customization service can query the preferences and return preferences associated with the unique identifier. It should be understood that this example is illustrative and therefore should not be construed as being limiting in any way. Regardless of the method employed, the preferences associated with the identifier can be identified and provided to the point-of-sale application.

The point-of-sale application can apply the preferences to a transaction occurring via the point-of-sale application and/or via a point-of-sale module associated with the point-of-sale application. The point-of-sale application can apply, to a transaction occurring via the point-of-sale application and/or the point-of-sale module, the preferences associated with a user device being used to conduct the transaction and/or in proximity of the point-of-sale module during the transaction. The point-of-sale application and/or the point-of-sale module can apply language preferences, payment preferences, security preferences, receipt preferences, automation preferences, privacy preferences, account information, user information, other information, or the like to the transactions including pre- and/or post-transaction actions. Because other types of preferences can be applied to the transaction and/or actions associated with the transaction, it should be understood that these examples are illustrative and therefore should not be construed as being limiting in any way. During the transaction and/or at other times, the point-of-sale module and/or the point-of-sale application also can determine if any preferences associated with the user device have been updated during the transaction and/or at other times. The point-of-sale application can be configured to provide updated preferences, if any, to the point-of-sale customization service.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for point-of-sale customization service will be described, according to an illustrative embodiment. The operating environment 100 shown in FIG. 1 includes a computing device 102 operating in communication with and/or as a part of a communications network ("network") 104. It should be understood that the computing device 102 can be located at a retail location or other location associated with a transaction. In some embodiments, the computing device 102 can correspond to a computer system associated with a cash register and/or a payment terminal. It should be understood that this example is illustrative and therefore should not be construed as being limiting in any way.

According to various embodiments, the functionality of the computing device 102 may be provided by one or more server computers, desktop computers, mobile telephones, laptop computers, set-top boxes, other computing systems, and the like. It should be understood that the functionality of the computing device 102 can be provided by a single device, by two similar devices, and/or by two or more dissimilar devices. For purposes of describing the concepts and technologies disclosed herein, the computing device 102 is described herein as an embedded computer system of a payment system. It should be understood that this embodiment is illustrative, and should not be construed as being limiting in any way.

The computing device 102 can execute an operating system 106 and one or more application programs such as, for example, a product scanning application, or the like. The application programs can include, in some embodiments, a point-of-sale application 108. The operating system 106 can include a computer program for controlling the operation of the computing device 102. The application programs and the point-of-sale application 108 can include executable programs configured to execute on top of the operating system 106 to provide various functions. According to various embodiments of the concepts and technologies described herein, the point-of-sale application 108 can include an executable program configured to execute on top of the operating system 106 to provide point-of-sale functionality such as, for example, transaction processing functionality, transaction logging functionality, receipt printing functionality, language translation functionality, messaging functionality, combinations thereof, or the like. The point-of-sale application 108 also can be configured to provide the functionality illustrated and described herein for interacting with and/or using a point-of-sale customization service.

In particular, the point-of-sale application 108 can be configured to provide processing at a point-of-sale. Thus, the point-of-sale application 108 can be configured to interact, via a communications link 112, with a user device 110 and/or a user at, near, or in association with a point-of-sale module, device, or terminal ("point-of-sale module") 114. The communications link 112 can be provided by wired interfaces, wireless interfaces, or the like. According to various embodiments, the communications link 112 can be provided by one or more NFC devices; one or more wireless transmission devices such as devices using one or more of BLUETOOTH, WiFi, WiMAX, or other wireless technologies; optical indicia such as bar codes, two dimensional bar codes, other indicia, or the like; infrared ("IR") or other optical technologies; other radio-frequency ("RF") technologies; combinations thereof; or the like. Regardless of the technologies used to support the communications link 112, it should be understood that the computing device 102, the point-of-sale module 114, and/or the user device 110 can communicate with each other and/or other devices using various embodiments of the communications link 112. Thus, it should be understood that multiple communication technologies can be used in various embodiments of the concepts and technologies described herein.

The point-of-sale application 108 also can be configured to provide one or more user interfaces at a display associated with and/or in communication with the point-of-sale module 114. The user interfaces can present instructions relating to a transaction, transaction details (itemized prices, total charges, etc.), transaction status information, or the like, for viewing or use of a user or other entity associated with the user device 110. The user interfaces also can be presented on input/output ("I/O") devices that can support output of information and/or input of information or the like (e.g., signatures, option selections, or the like). Thus, in some embodiments the point-of-sale application 108 and/or the point-of-sale module 114 can provide data for output or display at the user device 110. The point-of-sale application 108 also can provide other functionality for completing one or more transactions using the point-of-sale module 114 or other payment terminals.

According to various embodiments of the concepts and technologies described herein, the point-of-sale application 108 can obtain data during, before, or after transactions and provide user data 116 to a point-of-sale customization service 118. The user data 116 can include identifiers associated with the user device 110 and/or preferences associated with the user device 110. According to various embodiments, the point-of-sale customization service 118 can be executed and/or hosted by a computing resource or other device such as, for example, a server computer 120. It should be understood that the server computer 120 is one contemplated example of a computing device and should not be construed as being limiting in any way. The point-of-sale customization service 118 will be described in additional detail below.

The user data 116 can include various types of information including, but not limited to, payment information, settings, preferences, and/or other information. The payment information can include, for example, payment accounts or other methods of payment that may be used during one or more transactions, preferences relating to how and/or when the various payment methods are used, or the like. The settings and preferences can include, for example, various user or device preferences for use during one or more transactions. The settings and preferences can include, for example, language preferences, payment account preferences, discount account information, receipt options, name information, combinations thereof, or the like. Various embodiments of the settings and/or preferences will be illustrated and described herein and are included in the settings and/or preferences.

The other information can include various types of information and/or data. The other information can include, for example, one or more identifiers 122 associated with the user device 110. The identifiers 122 can include, for example, media access control ("MAC") address information, login information, userID information, name information, address information, combinations thereof, or the like. According to various embodiments, the identifiers 122 can include unique identifiers that can identify the user device 110 unambiguously from other devices. Other types of identifiers are possible and are contemplated and will be illustrated and described herein in more detail.

The point-of-sale application 108 executed by the computing device 102 can be configured to control operations of the point-of-sale module 114, to control interactions with a user device such as the user device 110, to control interactions with the point-of-sale customization service 118, combinations thereof, or the like. With regard to controlling communications with devices such as the user device 110, the point-of-sale application 108 can be configured obtain data from the user device 110 via the point-of-sale module 114. According to various embodiments, the point-of-sale application 108 can obtain, via the point-of-sale module 114, one or more of the identifiers 122 described above. The identifiers 122 can be used to identify the user device 110 or other device, a user, an account, or the like.

According to various embodiments, the point-of-sale application 108 also can obtain, via the point-of-sale module 114, other information from the user device 110 such as, for example, payment information, settings and preferences, account information, or the like, as explained above. According to various embodiments of the concepts and technologies described herein, however, the point-of-sale application 108 can be configured to obtain, via the point-of-sale module 114, one or more identifiers 122 as illustrated and described herein, and to use the identifier 122 to obtain one or more point-of-sale preferences (hereinafter referred to as "preferences") 124 associated with the user device 110.

According to various embodiments, the user device 110 can be configured to interact with the point-of-sale customization service 118 to generate the preferences 124 via providing, to the point-of-sale customization service 118, the user data 116. Thus, while FIG. 1 illustrates the user data 116 being provided to the point-of-sale customization service 118 by the computing device 102, it should be understood that this example is illustrative of one contemplated embodiment. According to various other embodiments, the user device 110 can provide the user data 116 to the point-of-sale customization service 118, and the point-of-sale customization service 118 can be configured to generate, based upon the user data 116, the preferences 124.

As shown in FIG. 1, the point-of-sale customization service 118 can be configured to store the preferences 124 in a data storage device such as a data store 126. The functionality of the data store 126 can be provided by one or more databases, server computers, desktop computers, mobile telephones, laptop computers, other computing systems, combinations thereof, and the like. In the illustrated embodiments, the functionality of the data store 126 is illustrated as being provided by a server computer that hosts or stores the preferences 124. It should be understood that this example is illustrative and therefore should not be construed as being limiting in any way.

As shown in FIG. 1, the preferences 124 can include various types of preferences that can be applied to one or more point-of-sale devices or systems for use before, during, or after transactions. The preferences 124 can be created, updated, deleted, and/or otherwise modified by users or other entities. In some embodiments, for example, a user or other entity can create or modify the preferences 124 by providing or modifying user data 116. The user data 116 can be analyzed by the point-of-sale customization service 118, and the preferences 124 can be created or modified based upon the information included in the user data 116. The preferences 124 can include, but are not limited to, data that represents one or more identifiers such as the identifiers 122, data that represents one or more payment methods, data that represents one or more language settings, data that represents one or more security settings, data that represents one or more receipt settings, data that represents one or more automation settings, data that represents one or more privacy settings, data that represents one or more accounts, data that represents one or more users, data that represents other information, combinations thereof, or the like. These and other types of preferences 124 will be described in further detail below.

The identifiers can include data that identifies a user, account, device, or the like. Thus, the identifiers shown as part of the preferences 124 can include the identifiers 122 and/or other types of identifiers, information, or other data that can identify users, accounts, devices, or the like. In some embodiments, the identifiers included in the preferences 124 can be associated with and/or can be referenced by the identifiers 122 identified by the computing device 102 or other devices. Thus, according to various embodiments of the concepts and technologies described herein, the point-of-sale customization service 118 can obtain an identifier 122 from the computing device 102, the user device 110, the point-of-sale module 114, or another entity and obtain, by searching the preferences 124 using the identifier 122, one or more preferences 124. It should be understood that this example is illustrative and therefore should not be construed as being limiting in any way.

The payment method preferences can include data that describes or represents one or more payment accounts such as, for example, one or more bank accounts, one or more credit card accounts, one or more other accounts (e.g., a wireless account), other payment accounts or methods, combinations thereof, or the like, as well as preferences for using the one or more payment accounts. The payment method preferences can be stored using various types of encryption to prevent or reduce the risk of malicious activity such as identity theft. Thus, the payment method preferences can be used to represent various payment methods, as well as preferences for using or applying the various payment methods. In some embodiments, the payment method preferences can define dollar amounts, locations, or other thresholds that can be used to modify which payment method is used for a particular transaction based upon amount, location, user, merchant, combinations thereof, or the like.

The language preferences can include data that can specify one or more languages for transactions, preferences for what languages are used and/or where the languages are used, combinations thereof, or the like. The language preferences can be provided to and/or used by the point-of-sale application 108 to configure output at the point-of-sale module 114 or elsewhere during a transaction. Thus, for example, if a user specifies a language preference as English, the point-of-sale application 108 can modify a user interface presented at the point-of-sale module 114 to present instructions or other information in English or to use English without the user or other entity affirmatively choosing English from a list of available language options. Additionally, users can specify various languages and/or preferences for various reasons. For example, a user may decide to use a foreign language to increase privacy or security, or for other reasons. The preferences can be used to specify when such languages may or may not be used. Because languages other than English are possible and are contemplated, it should be understood that the above example is illustrative and therefore should not be construed as being limiting in any way.

The security preferences can specify various security settings for use during transactions. The security preferences can include, for example, data specifying encryption preferences and/or technologies, supplemental authentication settings (e.g., personal identification numbers ("PINs") or other passcodes, secondary authentication settings, or the like), use of out-of-band authentication technologies, combinations thereof, or the like. The receipt preferences can include data that can specify a preference for printing receipts, for emailing or otherwise transmitting receipts, or combinations thereof. Thus, the receipt preferences can specify if printed receipts or electronically delivered receipts or both are desired by a particular user. Or course, the receipt preferences also can specify different preferences for different types of transactions, times, locations, or the like. It should be understood that this example is illustrative and therefore should not be construed as being limiting in any way.

The automation preferences can be used to specify how application of the preferences or settings to the functionality of the point-of-sale customization service 118 can be automated. Thus, for example, the user device 110 can be configured, via an application executed by the user device 110 or other functionality, to periodically search for a point-of-sale module 114 that is enabled or supported by a point-of-sale application such as the point-of-sale application 108. As such, the automation preferences can be used to support customization of the point-of-sale module 114 as illustrated and described herein in an automated fashion without requiring user input at the point-of-sale. Thus, for example, the automation preferences can specify whether or not the user device 110 is discoverable, whether preferences 124 should be loaded to the point-of-sale module 114 without user input, combinations thereof, or the like. Because the automation preferences can include settings or preferences for automating other aspects of point-of-sale customization, it should be understood that these examples are illustrative and therefore should not be construed as being limiting in any way.

The privacy preferences can specify various privacy settings that can be applied to transactions. The privacy preferences can indicate, for example, what information can or cannot be shared with a merchant during completion of the transaction. In some embodiments, for example, the privacy preferences can specify what information (other than transaction particulars) may or may not be shared with the point-of-sale module 114 and/or the computing device 102 to which the point-of-sale module 114 is connected. As such, a user or other entity can specify, via the privacy settings, whether transactions are to be completed anonymously, whether personal information can be shared with merchants, if email addresses can be shared, what protocols are allowed for data communications, combinations thereof, or the like. Because the privacy preferences can specify other aspects of transactions that may or may not be shared, it should be understood that these examples are illustrative and therefore should not be construed as being limiting in any way.

The accounts information can specify one or more user accounts associated with the point-of-sale customization service 118. In some embodiments, a device such as the user device 110 may be used by multiple users and therefore may be associated with multiple accounts or users. Thus, the account information can specify one or more accounts associated with the user device 110 and/or identifiers associated with the user device 110. Similarly, the user information can specify one or more users associated with the user device 110 and/or the point-of-sale customization service 118. These and other data can be used to allow association of multiple accounts and users with a particular device, identifier, payment method, or the like.

The other data can specify any other preferences or settings associated with the point-of-sale customization service 118. For example, the other data can be used to define transaction amount limits, location thresholds, goods and services limits, or the like. As such, the other data can be used to limit what types of transactions can or cannot be completed by specific users or devices and/or can specify additional actions (e.g., entry of a secondary or supplemental password) to allow a particular transaction. The other data also can be used to specify what types of communication protocols are allowed, limited, or the like.

In some embodiments, the other data also can include reminders. The reminders can be generated to remind a user or other entity to purchase a particular good or service when in the range of a particular point-of-sale module 114 or point-of-sale application 108 associated with an entity that sells the particular good or service. The other data also can define one or more "profiles" for the preferences 124. As used herein, a "profile" can refer to a group or set of preferences 124 for a user, account, device, or the like. A user, device, account, or the like can have multiple profiles, in some embodiments. Thus, a user may have a first profile for a first type of transaction, a second profile for a second type of transaction, or the like. The types of transactions can include dollar amounts associated with the profiles, locations associated with the profiles, times of day, or the like. In some embodiments, a user may have multiple profiles and may be given the opportunity to select a profile for use during a particular transaction without basing this selection on any particular consideration other than the user's choice.

In some other embodiments, the profiles can be automatically selected based upon transaction details. In one example embodiment, a user may have a first profile that specifies a first set of preferences 124 for a transaction under a dollar threshold such as one hundred dollars, two hundred dollars, four hundred fifty dollars, or the like, and a second profile for transactions over the dollar threshold. Thus, a user may apply certain security, payment, privacy, or other preferences if over the dollar threshold and/or other security, payment, privacy, or other preferences if under the dollar threshold. Other types of thresholds can be specified, if desired. Additionally, as noted above, users or other entities can be given the opportunity or ability to select a profile based upon any considerations with or without any thresholds.

The other data also can be used to define user interfaces. For example, the other data can define button locations, captions, instructions, and/or user interface layouts for the user or other entity. Thus, while some point-of-sale devices or systems may differ with respect to one another and therefore the locations and/or captions of controls on a user interface associated with the point-of-sale systems may differ, the concepts and technologies described herein can be used to define button or caption locations, contents, and/or actions triggered by the buttons or controls associated with the captions. Thus, for example, a user may define particular buttons, locations, captions, or the like, to provide a relatively uniform payment process at various point-of-sale devices and/or systems, according to some embodiments. Because the other data can include other information as illustrated and described herein, it should be understood that these examples are illustrative and therefore should not be construed as being limiting in any way.

In practice, the point-of-sale customization service 118 can obtain user data 116 from one or more sources. According to various embodiments, the point-of-sale customization service 118 can obtain the user data 116 via interactions with a user device 110, for example via a web portal, a web application, a standalone application executed by the user device 110, combinations thereof, or the like. Thus, a user or other entity can interact with the point-of-sale customization service 118 to create the user data 116 and/or to provide the user data 116 to the point-of-sale customization service 118.

In some other embodiments, the point-of-sale customization service 118 can obtain the user data 116 from the computing device 102, which as explained above can be associated with a particular point-of-sale or other location. According to some embodiments, a user or other entity can interact with a point-of-sale module 114 during a transaction and can specify, via one or more interactions, that the transaction settings should be stored for future use or application to future transactions. The point-of-sale application 108 can capture the transaction information (e.g., payment method, language preference, or the like) as the user data 116 and can provide the user data 116 to the point-of-sale customization service 118. Thus, the user data 116 can be used to create preferences 124 associated with a particular user, account, device, or the like using embodiments of the concepts and technologies described herein.

Regardless of how the point-of-sale customization service 118 receives the user data 116, the point-of-sale customization service 118 can analyze the user data 116 and can extract, from the user data 116, one or more preferences 124 such as payment preferences, or the like. The user data 116 also can include, or can be transmitted with, one or more identifiers 122, which as explained above can be used to identify a particular device such as the user device 110. In some embodiments, the identifier 122 can be captured by the point-of-sale module 114, for example via communication with an NFC device, or the like. Thus, the point-of-sale customization service 118 can also extract from the user data 116 or receive the identifier 122 and can associate the one or more preferences extracted from the user data 116 with the identifier 122.

As shown in FIG. 1, the point-of-sale customization service 118 can store point-of-sale preferences for various users, devices, and/or accounts as the preferences 124, and the preferences 124 can include, but are not limited to, the various types of information shown in FIG. 1. A user or other entity can interact with the point-of-sale customization service 118 to modify or supplement the preferences 124 at almost any time. Some example user interfaces for modifying the preferences 124 are illustrated and described herein with reference to FIGS. 4A-4B.

At some time, a device such as the user device 110 can enter a proximity of the point-of-sale module 114. The point-of-sale module 114 can identify the user device 110, for example via communicating with the user device 110 via a wired connection, WiFi connections, BLUETOOTH connections, ZIGBEE connections, NFC connections, or other wired, wireless, optical, short range, and/or long range communications. Upon recognizing the user device 110 in the proximity of the point-of-sale module 114, the point-of-sale module 114 or the point-of-sale application 108 can capture an identifier associated with the user device 110 such as the identifier 122 shown in FIG. 1. In various embodiments, the identifier 122 can be unique to a particular device, user, account, or the like.

The computing device 102 can, via execution of the point-of-sale application 108, transmit the identifier 122 to the point-of-sale customization service 118. The point-of-sale customization service 118 can search the preferences 124 using the identifier 122 to determine if preferences 124 associated with the identifier 122 are stored. The preferences 124 associated with the identifier 122 can be identified (e.g., via a database query executed against the preferences 124 by the point-of-sale customization service 118) and provided to the point-of-sale application 108.

The point-of-sale application 108 can apply the preferences 124 to a transaction occurring via the point-of-sale application 108 and/or via a point-of-sale module 114 associated with the point-of-sale application 108. Thus, the point-of-sale application 108 can apply, to a transaction occurring via the point-of-sale application 108 and/or the point-of-sale module 114, the preferences 124 associated with a user device 110 being used to conduct the transaction and/or in proximity of the point-of-sale module 114 during the transaction. Based upon the various types of preferences 124 that can be stored by the point-of-sale customization service 118, it can be appreciated that the point-of-sale application 108 and/or the point-of-sale module 114 can apply various types of preferences to the transaction and/or other activities occurring in association with the transaction (e.g., actions before, during, or after the transaction). Thus, the point-of-sale application 108 and/or the point-of-sale module 114 can apply language preferences, payment preferences, security preferences, receipt preferences, automation preferences, privacy preferences, account information, user information, other information, or the like to the transactions. Because other types of preferences 124 can be applied to the transaction and/or actions associated with the transaction, it should be understood that these examples are illustrative and therefore should not be construed as being limiting in any way.

During the transaction, the point-of-sale module 114 and/or the point-of-sale application 108 also can determine if any preferences 124 associated with the user device 110 have been updated. In particular, the preferences 124 applied to the transaction may specify, for example, a language, a payment account, or the like. During the transaction, the point-of-sale application 108 and/or the point-of-sale module 114 may determine that one of these preferences 124 has been overridden or changed. Based upon this determination, the point-of-sale application 108 can be configured to provide the updated preferences 124 to the point-of-sale customization service 118. Thus, embodiments of the concepts and technologies described herein can be used to update the preferences 124 via the point-of-sale customization service 118 in addition to, or instead of, the preferences 124 being updated by the user device 110 via interactions with the point-of-sale customization service 118. Because the preferences 124 can be updated in additional and/or alternative ways, it should be understood that these examples are illustrative and therefore should not be construed as being limiting in any way.

FIG. 1 illustrates one computing device 102, one network 104, one user device 110, one point-of-sale module 114, one server computer 120, and one data store 126. It should be understood, however, that various implementations of the operating environment 100 can include zero, one, or more than one computing device 102; zero, one, or more than one network 104; zero, one, or more than one user device 110; zero, one, or more than one point-of-sale module 114; zero, one, or more than one server computer 120; and/or zero, one, or more than one data store 126. As such, the illustrated embodiment should be understood as being illustrative, and should not be construed as being limiting in any way.

Figure 2:
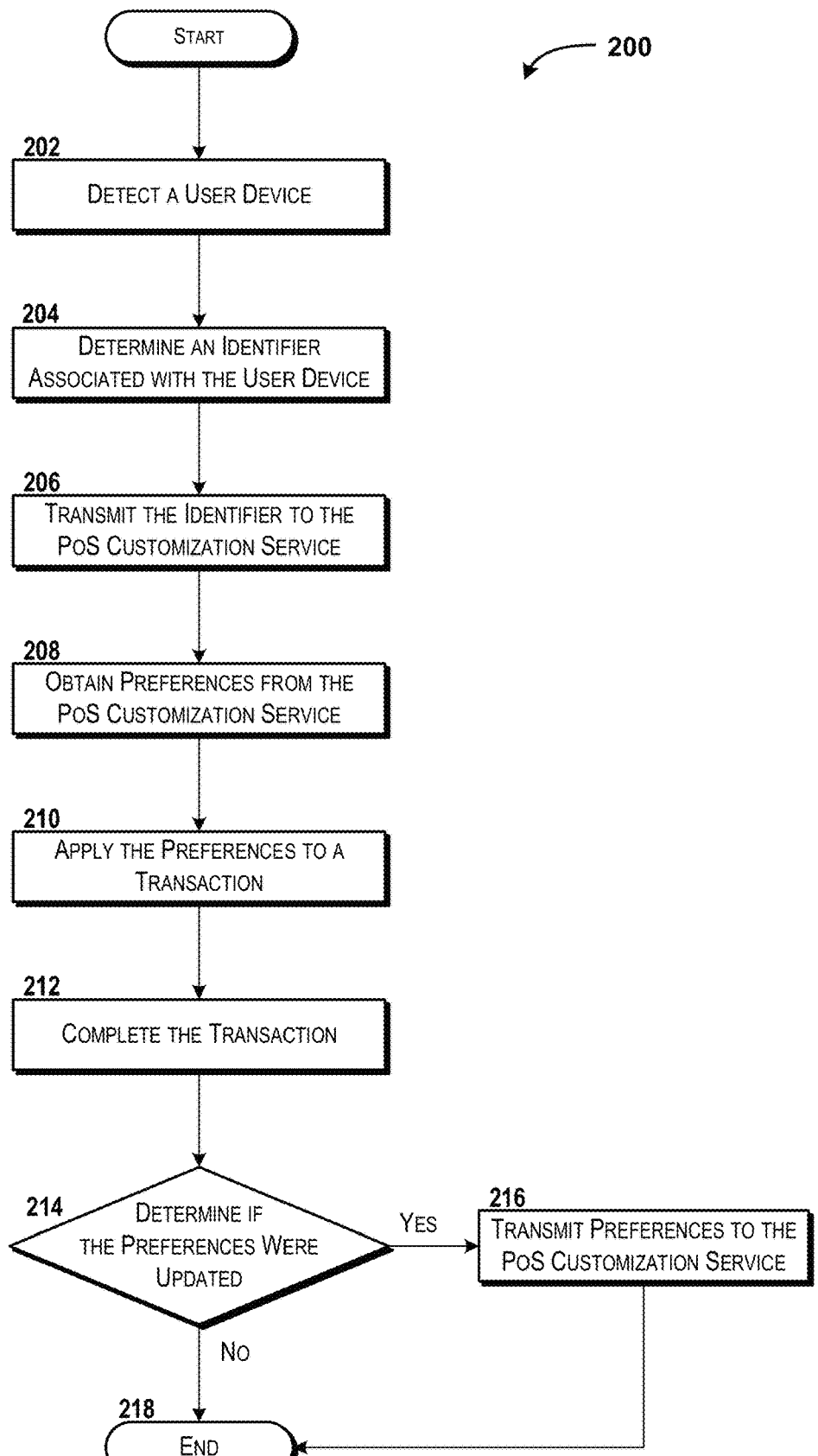
FIG. 2 is a flow diagram showing aspects of a method for completing a transaction using a point-of-sale customization service, according to an illustrative embodiment of the concepts and technologies described herein.

Turning now to FIG. 2, aspects of a method 200 for completing a transaction using a point-of-sale customization service 118 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the computing device 102, the user device 110, the point-of-sale module 114, and/or the server computer 120 to perform one or more operations and/or causing the processor to direct other components of these or other computing systems or devices to perform one or more of the operations.

For purposes of illustrating and describing the concepts of the present disclosure, the methods disclosed herein are described as being performed by the computing device 102 or the server computer 120 via execution of one or more software modules such as, for example, the point-of-sale application 108 or the point-of-sale customization service 118. It should be understood that additional and/or alternative devices and/or network nodes can provide the functionality described herein via execution of one or more modules, applications, and/or other software including, but not limited to, the point-of-sale application 108 or the point-of-sale customization service 118. Thus, the illustrated embodiments are illustrative, and should not be viewed as being limiting in any way.

The method 200 begins at operation 202. At operation 202, the computing device 102 can detect a user device such as the user device 110. The computing device 102 can detect the user device in a number of manners. In some embodiments, for example, the computing device 102 can be configured to periodically poll devices in a proximity of the computing device 102. For example, the computing device 102 can trigger a periodic broadcast of a signal and determine, based upon one or more responses to the broadcast, what devices are in the proximity of the computing device 102. It should be understood that the computing device 102 can trigger emission of the broadcast via other hardware such as, for example, the point-of-sale module 114. It should be understood that this example is illustrative and therefore should not be construed as being limiting in any way.

In some other embodiments, the computing device 102 can be configured to detect devices in the proximity based upon communications from the other devices (e.g., the user device 110). For example, the user device 110 and/or other devices can execute computer-executable instructions that, when executed by the user device 110 or other device, cause the user device 110 or other device to emit a signal that can be received by and/or interpreted by, the computing device 102 as indicating that the user device 110 or other device is in the proximity of the computing device 102. Thus, in some embodiments the user device 110 can be configured to periodically poll for devices such as the point-of-sale module 114 or the computing device 102, the computing device 102 or the point-of-sale module 114 can periodically poll for devices such as the user device 110, and/or combinations thereof. In some other embodiments, a user or other entity can select an option (e.g., by starting a point-of-sale application or by selecting a control within an application) to search for point-of-sale devices in a vicinity or proximity of the user or other entity (e.g., the user device 110). It should be understood that these examples are illustrative and therefore should not be construed as being limiting in any way.

In still other embodiments, the computing device 102 can detect the user device 110 or other device via other types of interactions. For example, in some embodiments the user device 110 may be brought into contact with the point-of-sale module 114 or the computing device 102 (e.g., for an NFC "tap" or the like). These and other types of operations may trigger the computing device 102 to detect the user device 110 or other device. In yet other embodiments, an operator, clerk, or other entity associated with the computing device 102 (e.g., a register operator) can identify the user device 110 or other device as in queue for a transaction and can trigger detection operations such as emission of NFC, RFID, infrared, or other signals such as WiFi, BLUETOOTH, or the like. In still other embodiments, a pressure sensor or other presence sensor can be located at a location associated with a queue for a payment device, and upon detecting a user or other entity at or near the presence sensory, the detection operations can be triggered as illustrated and described herein. Because the user device 110 or other device can be detected in numerous other ways, it should be understood that these examples are illustrative and therefore should not be construed as being limiting in any way.

From operation 202, the method 200 proceeds to operation 204. At operation 204, the computing device 102 can determine, detect, or identify an identifier 122 associated with the user device 110 detected in operation 202. The identifier 122 can correspond to various types of identifiers. In some embodiments, for example, the identifier 122 can include a hardware or network address such as, for example, a MAC address, an IP address, or the like. The identifier 122 also can correspond to device information such as an IMEI, an IMSI, a serial number, or other device identifier. The identifier 122 also can correspond to a userID, login, name, account number, email address, phone number, screen name, or other data. Regardless of the type of information used to provide the identifier 122, it can be appreciated that the identifier 122 can be unique to the user device 110 and therefore may be used to identify a particular user, a particular device, a particular account, or the like.

Figure 3:
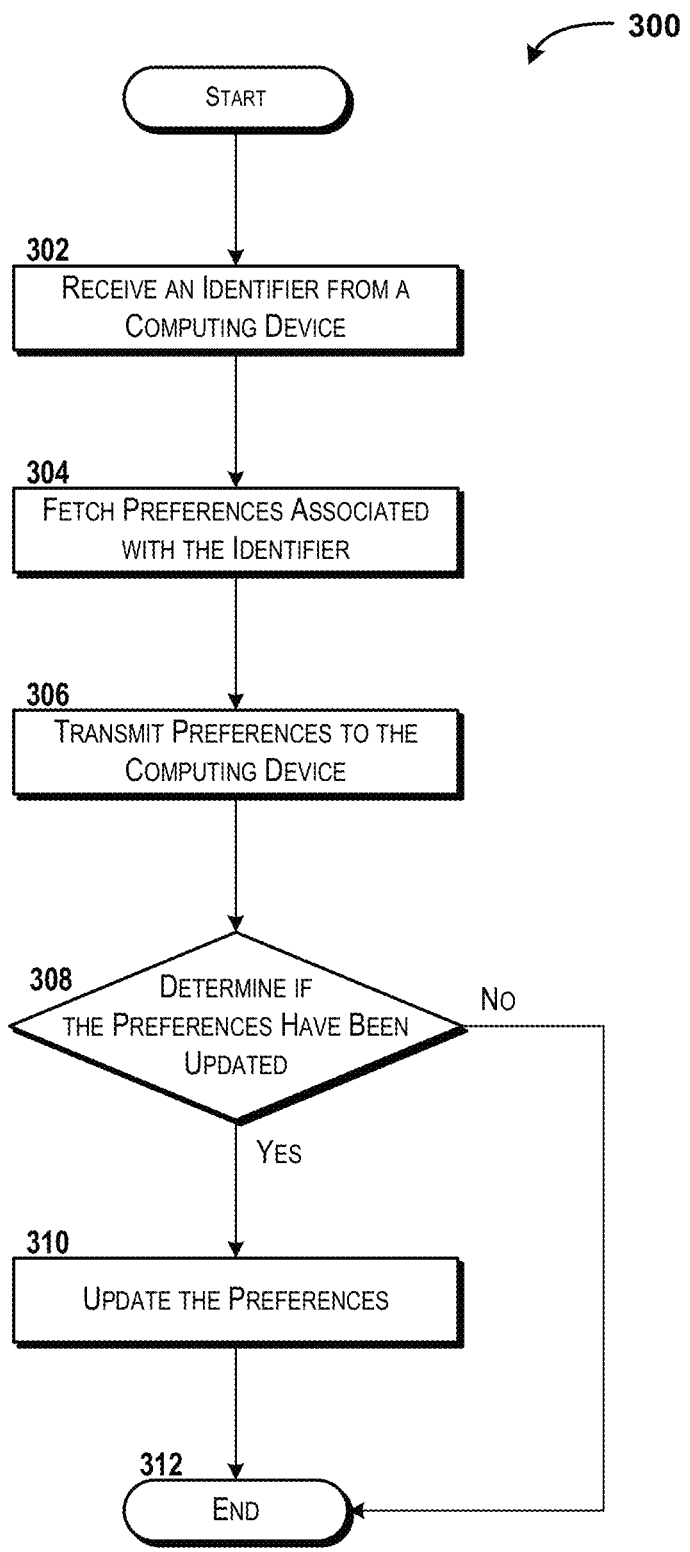
FIG. 3 is a flow diagram showing aspects of a method for providing preferences for a transaction using a point-of-sale customization service, according to an illustrative embodiment of the concepts and technologies described herein.

From operation 204, the method 200 proceeds to operation 206. At operation 206, the computing device 102 can transmit the identifier 122 determined in operation 204 to a point-of-sale customization service 118 or other module executed by a computing device such as the server computer 120. According to various embodiments, the point-of-sale customization service 118 can be executed by a device that can expose an application programming interface ("API") via which the identifier 122 can be submitted. As such, it can be appreciated that submission or transmission of the identifier 122 to the server computer 120 or other computing device that executes the point-of-sale customization service 118 can operate as a function or service call. As such, receipt of the identifier 122 by a device that executes the point-of-sale customization service 118 can trigger the point-of-sale customization service 118 to search for and/or identify preferences 124 associated with the identifier 122 determined in operation 204. An example embodiment of the point-of-sale customization service 118 identifying the preferences 124 based upon the identifier 122 will be illustrated and described herein with reference to FIG. 3. It should be understood that the example embodiment shown in FIG. 3 is illustrative and therefore should not be construed as being limiting in any way.

From operation 206, the method 200 proceeds to operation 208. At operation 208, the computing device 102 can obtain preferences 124 from the point-of-sale customization service 118. In operation 208, the computing device 102 can receive the preferences 124 associated with the user device 110 or other device detected in operation 202 by way of the identifier 122 as explained with reference to operation 206.

It can be appreciated that the point-of-sale customization service 118 can execute various operations to identify the preferences 124 and/or to provide the preferences 124 to the computing device 102. One example embodiment of a method that can be executed by the point-of-sale customization service 118 to identify and/or provide the preferences 124 will be illustrated and described herein with reference to FIG. 3. It should be understood that this embodiment is illustrative and therefore should not be construed as being limiting in any way.

Although not separately illustrated in FIG. 2, operation 208 can include obtaining multiple sets or subsets of preferences 124 such as one or more profiles as illustrated and described above with reference to FIG. 1. Thus, although not shown in FIG. 2, the computing device 102 can generate or trigger one or more user interface displays for obtaining, from a user or other entity, selection of a profile or other set of preferences 124 that is to be used for a transaction. Thus, for example, a user interface can be presented at the point-of-sale module 114, the user device 110, or elsewhere for obtaining, from the user or other entity, a choice of a profile or other set of preferences 124 that is to be used for a particular transaction. As such, operation 208 can include obtaining one or more profiles or sets of preferences 124 and/or obtaining selection of a desired set or profile of the preferences 124 from a user or other entity, in some embodiments.

From operation 208, the method 200 proceeds to operation 210. At operation 210, the computing device 102 can apply the preferences 124 obtained and/or selected in operation 208 to a transaction occurring at or in association with the computing device 102. Thus, for example, the computing device 102 can apply one or more payment method preferences, language preferences, security preferences, receipt preferences, automation preferences, privacy preferences, or the like, to the transaction. It can be appreciated that some of the preferences 124 may affect how the transaction is set up, completed, and/or how post-transaction operations occur. Additionally, or alternatively, the computing device 102 can apply account information, user information, other data, and/or the like to the transaction.

From operation 210, the method 200 proceeds to operation 212. At operation 212, the computing device 102 can complete the transaction. In some embodiments, the user device 110 or other device (or other entity) can change one or more of the preferences 124 during the transaction. For example, the user device 110 or other entity can change the payment method, language, receipt preference, or other preferences 124 during the transaction. In some embodiments, the user device 110 or other device can query a user or other entity to indicate if the changed preference 124 should be stored for future use or not. In addition to detecting changed preferences 124 and/or querying users or devices based upon the detected changes, the computing device 102 can complete the transaction. According to various embodiments, the computing device 102 can obtain payment for a good or service, and provide output (e.g., a receipt, screen display, text message, email, or the like) to the user device 110 or other entities to indicate that the transaction has been completed. It can be appreciated that the computing device 102 can communicate with payment portals, banks, and/or other entities to complete the transaction.

From operation 212, the method 200 proceeds to operation 214. At operation 214, the computing device 102 can determine if the preferences 124 applied to the transaction in operation 210 were changed during completion of the transaction in operation 212. If the computing device 102 determines, in operation 214, that the preferences 124 were updated, the method 200 can proceed to operation 216. In operation 216 the computing device 102 can transmit the preferences 124 to the point-of-sale customization service 118. In some embodiments, the computing device 102 can identify the preferences 124 that have been changed or updated and transmit only the updated or changed preferences 124 to the point-of-sale customization service 118 in operation 216.

In some other embodiments, the computing device 102 can transmit all of the preferences 124 (including updated or changed preferences 124) to the point-of-sale customization service 118 in operation 216. Thus, it can be appreciated that if no preferences 124 existed for the device detected in operation 202, the preferences 124 can be created during the transaction and provided to the point-of-sale customization service 118 in operation 216. As such, the method 200 can be executed to create preferences 124 for a device or user in addition to, or instead of, obtaining and applying existing preferences 124 to a transaction as illustrated in FIG. 2. As such, it should be understood that the embodiment shown in FIG. 2 is illustrative of one embodiment of the concepts and technologies described herein and should not be construed as being limiting in any way.

If the computing device 102 determines, in operation 214, that the preferences 124 were not updated during the transaction, the method 200 can proceed to operation 218. The method 200 also can proceed to operation 218 from operation 216. The method 200 ends at operation 218.

Turning now to FIG. 3, aspects of a method 300 for providing preferences 124 using a point-of-sale customization service 118 will be described in detail, according to an illustrative embodiment. The method 300 begins at operation 302. At operation 302, the server computer 120 can receive an identifier 122 from a device such as the computing device 102. As noted above, the identifier 122 can be unique to a particular user, device, account, or the like.

The identifier 122 can be provided with a request, in some embodiments. The request can include, for example, a service call or request for the server computer 120 to provide the preferences 124. In some other embodiments, the identifier 122 can be interpreted by the server computer 120 as a request for the preferences 124. As such, it should be understood that the functionality of the point-of-sale customization service 118 can be explicitly called or requested, or can be triggered by receipt of the identifier 122. Thus, it can be appreciated that the identifier 122 received in operation 302 can be received with requests, service calls, or the like, or that the identifier 122 can be interpreted as a request, service, call, or the like.

From operation 302, the method 300 proceeds to operation 304. At operation 304, the server computer 120 can fetch, identify, and/or otherwise obtain preferences 124 associated with the identifier 122 received in operation 302. In operation 304, the server computer 120 can query the preferences 124 to identify one or more preferences 124 associated with the identifier 122 received in operation 302. It can be appreciated that the preferences 124 can be stored and/or associated with one or more identifiers 122 and as such, the preferences 124 can be queried based upon the identifier 122, if desired. Thus, in operation 304, the server computer 120 can query the preferences 124 and obtain, as a response to the query, the preferences 124. Because the preferences 124 associated with the identifier 122 can be fetched, obtained, and/or identified in additional and/or alternative ways, it should be understood that these examples are illustrative and therefore should not be construed as being limiting in any way.

From operation 304, the method 300 proceeds to operation 306. At operation 306, the server computer 120 can transmit the preferences 124 fetched or otherwise obtained in operation 306 to the computing device 102. It therefore can be appreciated that operations 302-306 of the method 300 can occur in conjunction with the computing device 102 requesting and being provided with the preferences 124 as illustrated and described above with reference to operations 206-208 of the method 200, in some embodiments, though this is not necessarily the case. It should be understood that this example is illustrative and therefore should not be construed as being limiting in any way.

From operation 306, the method 300 proceeds to operation 308. At operation 308, the server computer 120 can determine if the preferences 124 have been updated. According to various embodiments, the server computer 120 can determine that the preferences 124 have been updated by receiving, from the computing device 102 or other device such as the user device 110, an update to the preferences 124. In some other embodiments, the preferences 124 can be updated via interactions with the server computer 120 by various devices such as the user device 110, a computer (e.g., via a web portal), other devices or the like. Regardless of how the preferences 124 are updated (or not updated), the server computer 120 can determine, in operation 308, if any changes have been made to the preferences 124. It can be appreciated that the functionality of operation 308 can occur at any time and need not be completed in conjunction with completion of operations 302-306 or other operations. As such, the illustrated embodiment should not be construed as being limiting in any way.

If the server computer 120 determines, in operation 308, that the preferences 124 have been updated, the method 300 can proceed to operation 310. At operation 310, the server computer 120 can update the preferences 124. Thus, in operation 310, the server computer 120 can create, update, delete, or otherwise modify one or more records that correspond to the preferences 124. It should be understood that the functionality of operation 310 can be completed at any time and need not be completed in conjunction with completion of operations 302-306 as noted above with reference to operation 308.

From operation 310, the method 300 proceeds to operation 312. The method 300 also can proceed to operation 312 from operation 308 if the server computer 120 determines, in operation 308, that the preferences 124 have not been updated. The method 300 ends at operation 312.

Figure 4A:
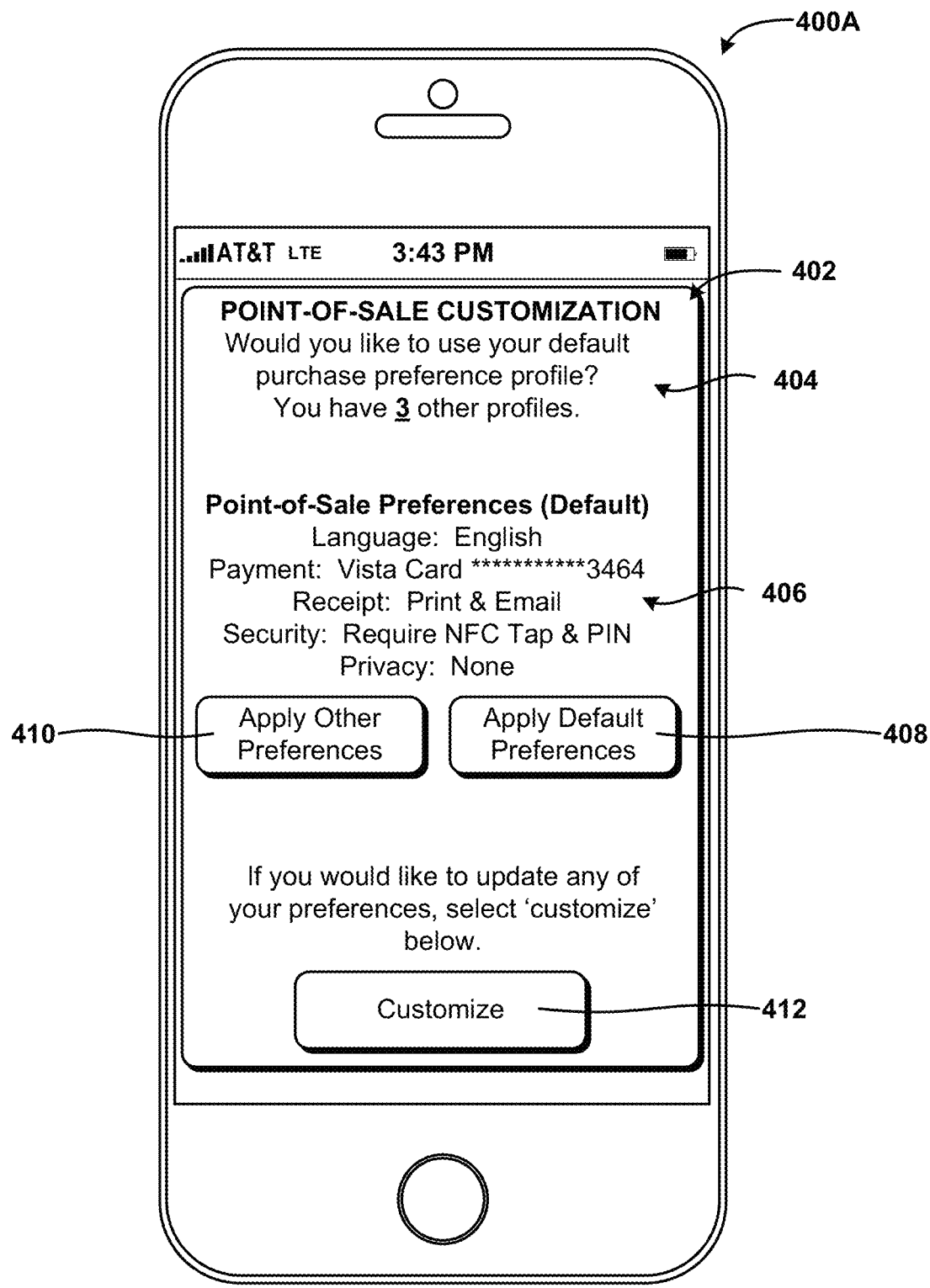
FIGS. 4A-4B are user interface diagrams showing illustrative screen displays for configuring, interacting with, and using a point-of-sale customization service, according to some illustrative embodiments of the concepts and technologies described herein.
Figure 4B:
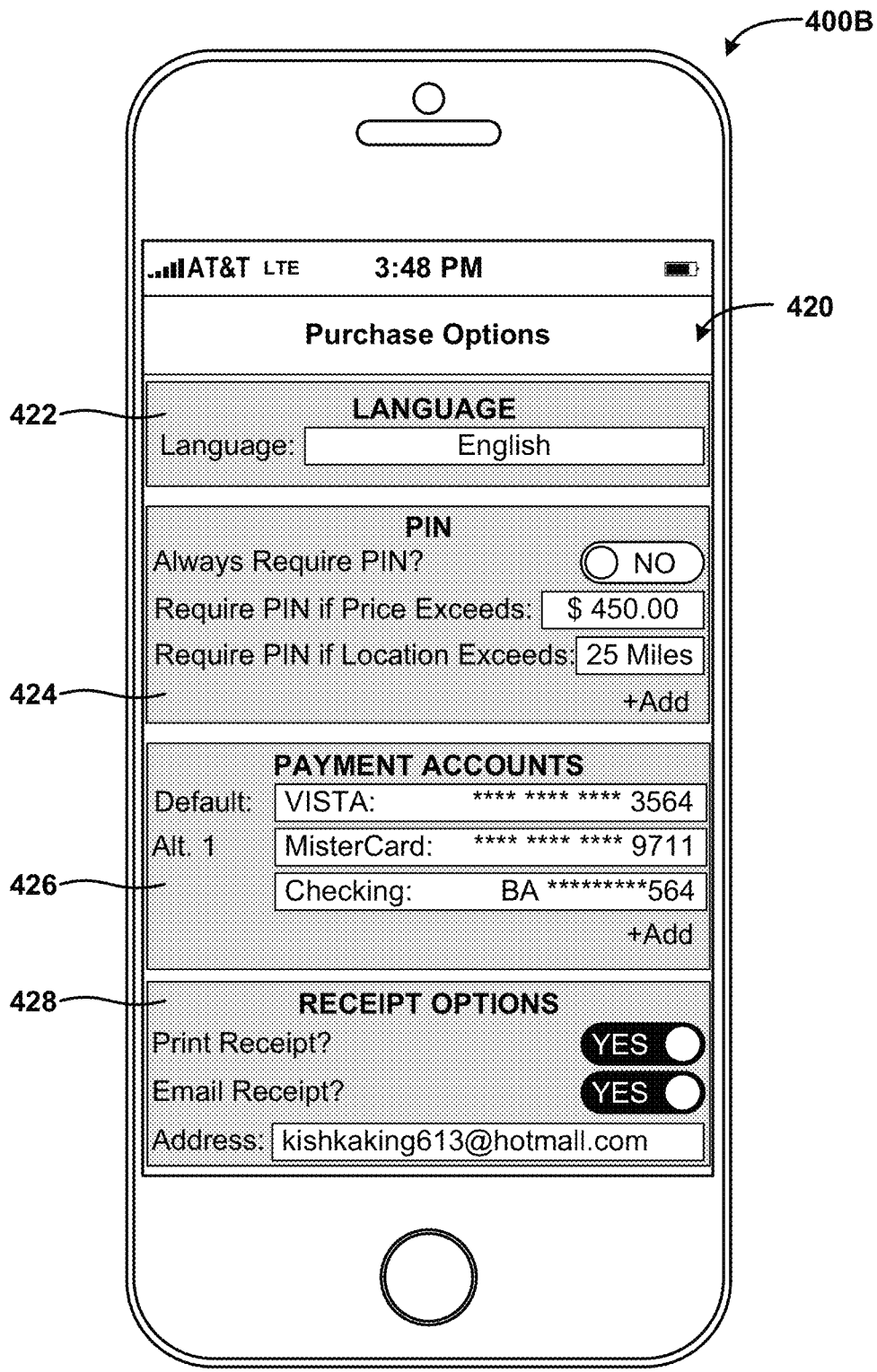

FIGS. 4A-4B are user interface ("UI") diagrams showing aspects of UIs for controlling and/or interacting with a point-of-sale customization service 118, a point-of-sale module 114, and/or a computing device executing a point-of-sale application 108 such as the computing device 102, according to some illustrative embodiments. FIG. 4A shows an illustrative screen display 400A, which can be generated by a device such as the user device 110, the point-of-sale module 114, the computing device 102, and/or other devices or entities. In the embodiments described herein, the screen display 400A is illustrated and described as being presented by the user device 110. It should be understood that this example is illustrative and therefore should not be construed as being limiting in any way.

According to various embodiments, the user device 110 can generate the screen display 400A and/or other screen displays in conjunction with and/or based upon interactions with the point-of-sale module 114, the computing device 102, and/or the point-of-sale customization service 118 described herein. Thus, while the screen display 400A is described as being presented at the user device 110, it should be understood that data for presenting the screen display 400A can be generated at other devices and provided to the user device 110 by those or other entities. It should be appreciated that the UI diagram illustrated in FIG. 4A is illustrative of one contemplated example of the UIs that can be generated and/or displayed in accordance with the concepts and technologies disclosed herein, and therefore should not be construed as being limited in any way.

In some embodiments, presentation of the screen display 400A at the user device 110 can be triggered, for example, in response to the point-of-sale module 114 and/or the computing device 102 detecting an interaction between the point-of-sale module 114 and/or the point-of-sale application 108 with the user device 110; based upon a trigger by the point-of-sale customization service 118; in response to a first execution of or interaction with the point-of-sale application 108 and/or the point-of-sale customization service 118; based upon other triggers or detected events; combinations thereof; or the like. Because the screen display 400A illustrated in FIG. 4A can be displayed at additional and/or alternative times, it should be understood that these examples are illustrative and therefore should not be construed as being limiting in any way.

The screen display 400A can include various menus and/or menu options (not shown in FIG. 4A). The screen display 400A also can include a point-of-sale customization display 402. The point-of-sale customization display 402 can be configured to allow a user or other entity to enable customization of a point-of-sale device such as the computing device 102, the point-of-sale application 108 executed thereby, and/or the point-of-sale module 114.

As shown in FIG. 4A, the point-of-sale customization display 402 can include a prompt 404. The prompt 404 can inform a user or other entity that an option for customizing a point-of-sale device exists. In some embodiments, display of the prompt 404 can occur in response to the user device 110 being detected in a proximity of the point-of-sale module 114 and/or the computing device 102; the computing device 102 and/or the point-of-sale module 114 detecting the user device 110; and/or in response to other determinations. In some contemplated embodiments, for example, the user device 110 can include an NFC chip or device. When the user device 110 is brought within operating or detection range of the point-of-sale module 114, an application executed by the user device 110, the point-of-sale module 114, and/or the computing device 102 can trigger presentation of the point-of-sale customization display 402 and/or the prompt 404. It should be understood that this example is illustrative and therefore should not be construed as being limiting in any way.

The point-of-sale customization display 402 also can include an indication 406. The indication 406 can provide information about a selected or default profile or other set of preferences 124. The indication 406 can indicate or represent a language choice, a payment method, a receipt preference, security preferences, privacy preferences, other information, combinations thereof, or the like. The indication 406 can be omitted in some embodiments. In some embodiments, the indication 406 can include options (not shown in FIG. 4A) for editing the preferences 124, if desired. Thus, a user or other entity can edit one or more of the preferences 124 as displayed on the point-of-sale customization display 402, if desired. It should be understood that this example embodiment is illustrative and therefore should not be construed as being limiting in any way.

The point-of-sale customization display 402 also can include an apply default preferences option 408. The apply default preferences option 408 can, when selected by a user or other entity, trigger the user device 110 to inform the point-of-sale module 114, the computing device 102, the point-of-sale customization service 118, and/or other devices to apply the default preferences to a transaction. The point-of-sale customization display 402 also can include an apply other preferences option 410. The apply other preferences option 410 can, when selected by a user or other entity, trigger the user device 110 to obtain one or more profiles or other sets of preferences 124 from which the user or other entity can choose a desired profile or other set of preferences.

The point-of-sale customization display 402 also can include a customize preferences option 412. The customize preferences option 412 can, when selected by a user or other entity, trigger the user device 110 to enable updating or other modifications to the preferences 124. Thus, for example, the user device 110 can enable changes to any of the preferences 124 and/or can enable interactions with the point-of-sale customization service 118 to update or otherwise modify the preferences 124 associated with the user device 110, the user, an account, another device, and/or a profile. It should be understood that this example is illustrative and therefore should not be construed as being limiting in any way.

Referring now to FIG. 4B, a UI diagram showing additional aspects of the concepts and technologies disclosed herein for providing a point-of-sale customization service 118 is described in detail. In particular, FIG. 4B shows an illustrative screen display 400B, which can be generated by a device such as the user device 110 or other devices as illustrated and described herein. It should be appreciated that the UI diagram illustrated in FIG. 4B is illustrative of one contemplated example of the UIs that can be generated and/or displayed in accordance with the concepts and technologies disclosed herein, and therefore should not be construed as being limited in any way.

The screen display 400B can include a point-of-sale customization options display 420. The point-of-sale customization options display 420 can be used to create, update, delete, and/or otherwise modify one or more preferences 124 associated with a user, account, device, or the like. It can be appreciated that the point-of-sale customization options display 420 can be presented in response to a user selecting an option to use a point-of-sale customization application, which can be executed by the user device 110; in response to the user or other entity selecting the customize preferences option 412 shown in FIG. 4A; and/or in response to other actions. Because the point-of-sale customization options display 420 can be displayed at additional and/or alternative times, it should be understood that these examples are illustrative, and should not be construed as being limiting in any way.

The point-of-sale customization options display 420 can include various types of preferences 124 as illustrated and described herein and is not necessarily limited to presenting the illustrated types of preferences 124. As shown in FIG. 4B, the point-of-sale customization options display 420 can include a language preferences menu 422. A user or other entity can interact with the language preferences menu 422 to set a language such as English, French, Spanish, German, Hebrew, Russian, Chinese, or the like. In some embodiments, the language preferences can include settings for indicating hearing impairment options, sight impairment options, or the like. As such, the illustrated embodiment should be understood as one example embodiment and should not be construed as being limiting in any way.

The point-of-sale customization options display 420 can include a security preferences menu 424. A user or other entity can interact with the security preferences menu 424 to set one or more security preferences. In the illustrated embodiment, the security preferences menu 424 can include settings for requiring a PIN or other authentication information during a transaction. Thus, the security preferences can include the option to always require a PIN (or other authentication information), an option to set a dollar amount for requiring a PIN or other authentication information (e.g., if a transaction exceeds a particular dollar amount the PIN will be required), an option to set a location threshold within which a PIN may or may not be required, combinations thereof, or the like. As can be seen in FIG. 4B, the security preferences menu 424 also can include an option, control, link, or other functionality for triggering creation of other thresholds, or the like. Because other privacy settings are contemplated and are possible (e.g., allowing or restricting sharing of identifying information, allowing or restricting sharing of contact information, or the like), the illustrated embodiment should be understood as one example embodiment and should not be construed as being limiting in any way.

The point-of-sale customization options display 420 can include a payment method preferences menu 426. The payment method preferences menu 426 can be interacted with by a user or other entity to create or modify one or more payment accounts for transactions completed using the user device 110. As shown in FIG. 4B, three payment accounts are shown as having been created. In particular, the payment method preferences menu 426 shows a default payment account, a first alternative payment account, and a second alternative payment account. In some embodiments, the payment accounts can be attempted in a defined order (e.g., default account first, first alternative second, second alternative third, or the like) for a transaction, while in some other embodiments a user or other entity may choose a desired payment account at transaction time, if desired.

The payment method preferences menu 426 also can include options for adding payment accounts and/or other options such as preferences for specifying when particular payment accounts are used, or the like. In one contemplated embodiment, the preferences 124 can include options for specifying when a first payment account is used (e.g., a dollar amount, a location, a merchant, or the like), options for specifying when a second payment account is used (e.g., a different dollar amount, a different location, a different merchant, or the like), and other options. As such, the illustrated embodiment should be understood as one example embodiment and should not be construed as being limiting in any way.

Figure 5:
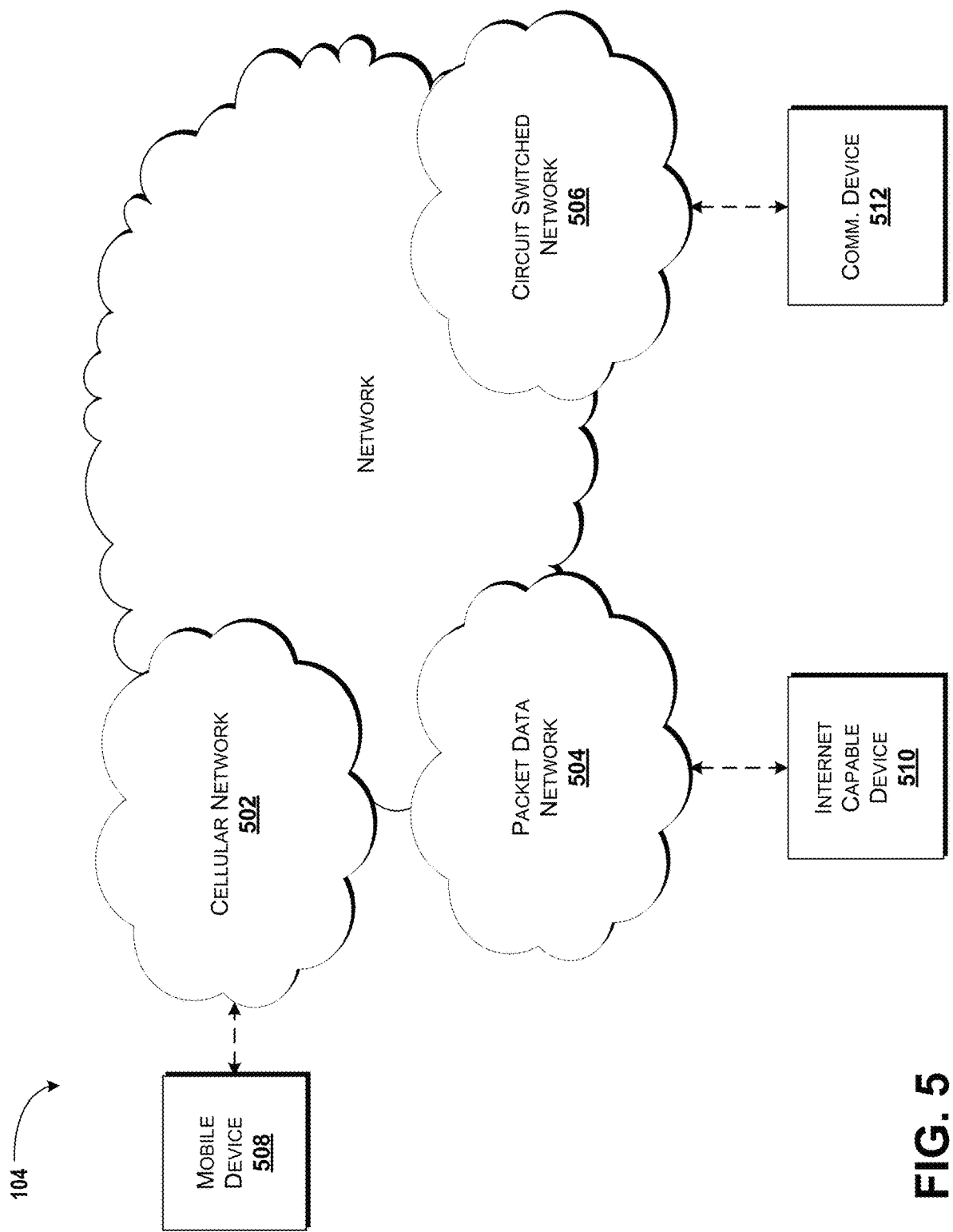
FIG. 5 schematically illustrates a network, according to an illustrative embodiment of the concepts and technologies described herein.

The point-of-sale customization options display 420 also can include a receipt options menu 428. A user or other entity can interact with the receipt options menu 428 to specify if receipts should be printed on paper, emailed or otherwise electronically transmitted, combinations thereof, or the like. The receipt options menu 428 also can include a field for an email address, user name, phone number, or other identifier for indicating a recipient or destination for electronic versions of the receipt, if desired. Because other receipt options are possible (e.g., specifying dollar amounts, merchants, locations, or the like for which printed receipts and/or electronic receipts are or are not desired) and are contemplated, the illustrated embodiment should be understood as one example embodiment and should not be construed as being limiting in any way.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSDPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
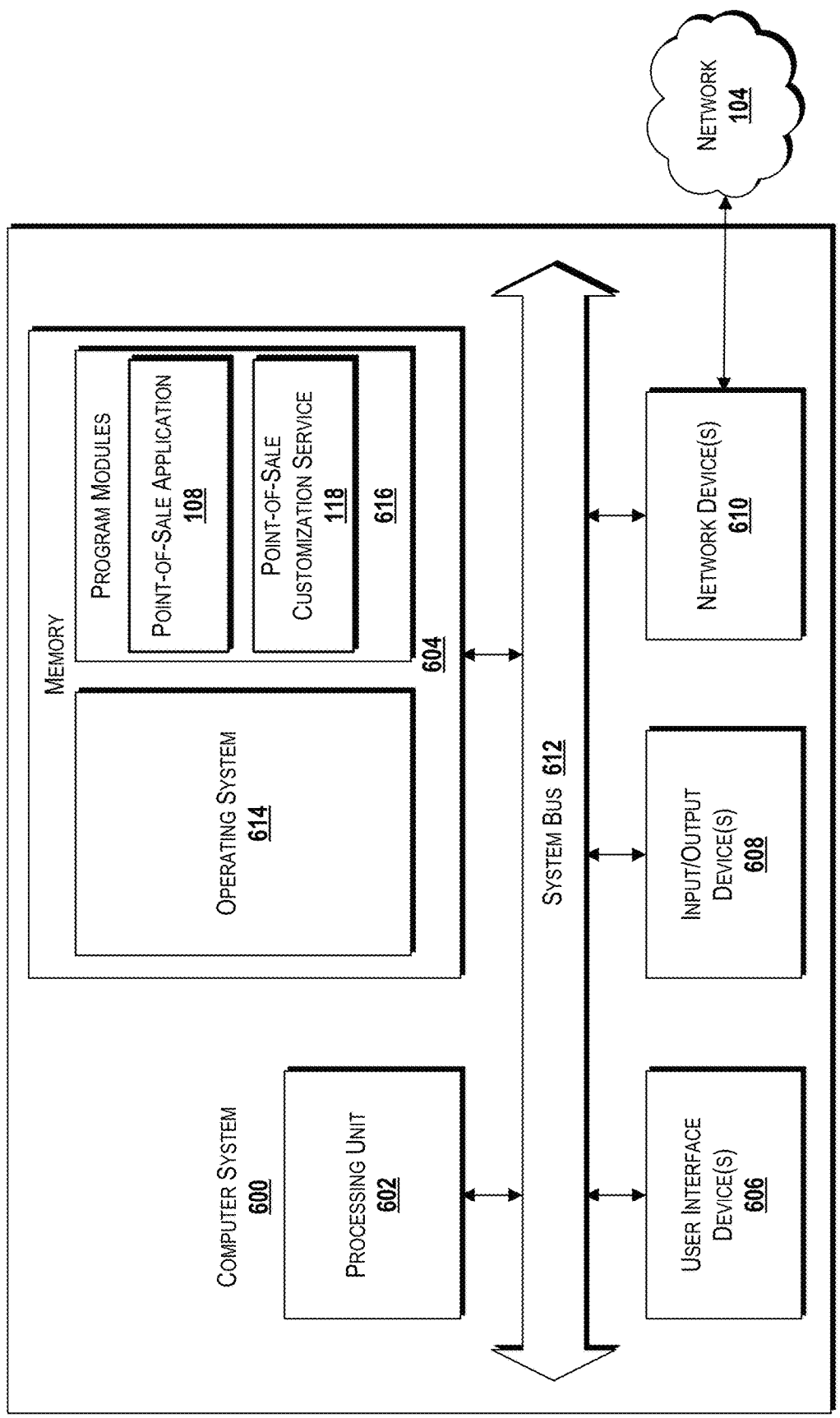
FIG. 6 is a block diagram illustrating an example computer system configured to provide or interact with a point-of-sale customization service, according to some illustrative embodiments of the concepts and technologies described herein.

FIG. 6 is a block diagram illustrating a computer system 600 configured to provide the functionality described herein for providing and/or using a point-of-sale customization service, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the point-of-sale customization service 118 and/or the point-of-sale application 108. This and/or other programs can be embodied in computer-readable media containing instructions that, when executed by the processing unit 602, perform one or more of the methods 200, 300 described in detail above with respect to FIGS. 2-3. According to embodiments, the program modules 616 may be embodied in hardware, software, firmware, or any combination thereof. Although not shown in FIG. 6, it should be understood that the memory 604 also can be configured to store the user data 116, the identifier 122, the preferences 124, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
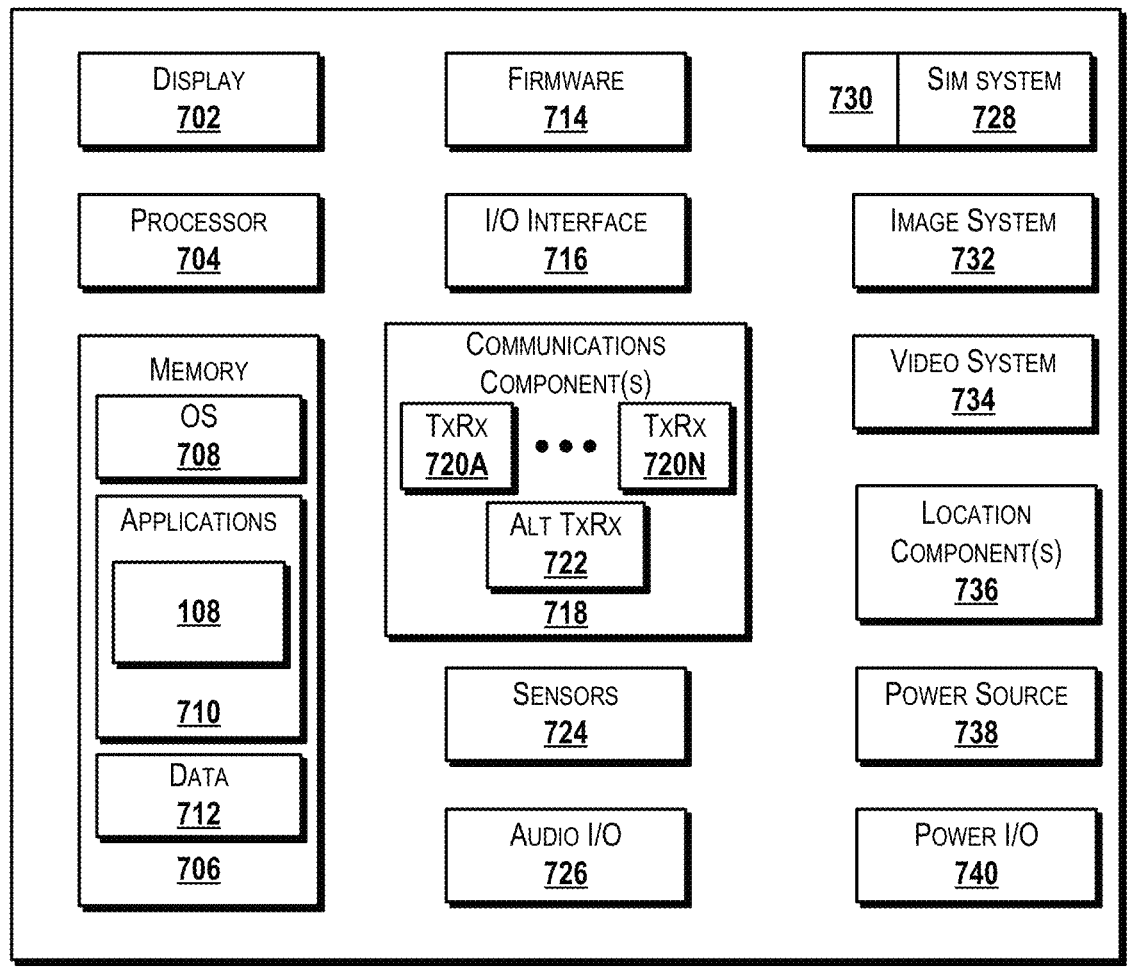
FIG. 7 is a block diagram illustrating an example mobile device configured to interact with a point-of-sale customization service, according to some illustrative embodiments of the concepts and technologies described herein.

Turning now to FIG. 7, an illustrative mobile device 700 and components thereof will be described. In some embodiments, the computing device 102 and/or the user device 110 described above with reference to FIG. 1 can be configured as and/or can have an architecture similar or identical to the mobile device 700 described herein in FIG. 7. It should be understood, however, that the user device 110 may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various graphical user interface ("GUI") elements for creating, updating, deleting, or otherwise modifying the preferences 124, text, images, video, virtual keypads and/or keyboards, messaging data, notification messages, metadata, internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the point-of-sale application 108, the point-of-sale customization service 118, other computer-executable instructions stored in a memory 706, or the like. In some embodiments, the applications 710 also can include a UI application (not illustrated in FIG. 7).

The UI application can interface with the operating system 708, such as the operating system 106 shown in FIG. 1, to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, creating the preferences 124, updating or otherwise modifying the preferences 124, initiating use of the point-of-sale application 108, interacting with the point-of-sale module 114 and/or the point-of-sale customization service 118, configuring settings, manipulating address book content and/or settings, multimode interaction, interacting with other applications 710, and otherwise facilitating user interaction with the operating system 708, the applications 710, and/or other types or instances of data 712 that can be stored at the mobile device 700. The data 712 can include, for example, the user data 116, the identifier 122, the preferences 124, and/or other applications or program modules. According to various embodiments, the data 712 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information, the user data 116, the identifier 122, the preferences 124, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as the network 104 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSDPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Based on the foregoing, it should be appreciated that systems and methods for providing and using a point-of-sale customization service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
   detecting, by a computing device and via a point-of-sale module comprising a payment terminal, a user device in a proximity of the point-of-sale module;
   in response to detecting the user device, obtaining, by the computing device and via the point-of-sale module, a unique identifier associated with the user device;
   determining, by the computing device and based on input detected by the user device, that point-of sale preferences that are associated with the user device are to be used during a transaction; and
   transmitting, by the computing device, the unique identifier to a point-of-sale customization service to obtain the point-of-sale preferences, wherein the point-of-sale preferences define a payment account that is to be used by the point-of-sale module for a payment during the transaction.

2. The method of claim 1, wherein the input comprises selection of an option to use the point-of-sale preferences.

3. The method of claim 1, further comprising:
   applying, by the computing device, the point-of-sale preferences to the point-of-sale module for use during the transaction.

4. The method of claim 1, wherein the point-of-sale preferences define the payment account as one of a first payment account or a second payment account, wherein the payment account is defined as the first payment account if the transaction is associated with a first location or a first merchant, and wherein the payment account is defined as the second payment account if the transaction is associated with a second location or a second merchant.

5. The method of claim 1, wherein the point-of-sale preferences comprise:
   a security preference that specifies an encryption technology to be used by the point-of-sale module.

6. The method of claim 1, wherein the point-of-sale preferences define the payment account based on a location associated with the transaction.

7. The method of claim 1, wherein the point-of-sale preferences define the payment account based on a merchant associated with the transaction.

8. The method of claim 1, wherein the point-of-sale preferences further define a supplemental authentication setting to be used during the transaction.

9. The method of claim 1, wherein the point-of-sale preferences further define a privacy setting that indicates what information can be shared with the computing device or the point-of-sale module during the transaction.

10. A system comprising:
a computing device comprising a processor; and
a memory that stores computer-executable instructions that, when executed by the processor, cause the processor to perform operations comprising
detecting, by the computing device and via a point-of-sale module comprising a payment terminal, a user device in a proximity of the point-of-sale module,
in response to detecting the user device, obtaining, by the computing device and via the point-of-sale module, a unique identifier associated with the user device,
determining, by the computing device and based on input detected by the user device, that point-of sale preferences that are associated with the user device are to be used during a transaction, and
transmitting, by the computing device, the unique identifier to a point-of-sale customization service to obtain the point-of-sale preferences, wherein the point-of-sale preferences define a payment account that is to be used by the point-of-sale module for a payment during the transaction.

11. The system of claim 10, wherein the point-of-sale preferences comprise:
a security preference that specifies an encryption technology to be used by the point-of-sale module for the transaction.

12. The system of claim 10, wherein the computer-executable instructions, when executed by the processor, cause the processor to perform operations further comprising:
determining that the point-of-sale preferences associated with the user device were updated during the transaction; and
updating the point-of-sale preferences based upon a determined update to the point-of-sale preferences associated with the user device.

13. The system of claim 10, wherein the point-of-sale preferences define the payment account based on a location associated with the transaction.

14. The system of claim 10, wherein the point-of-sale preferences define the payment account based on a merchant associated with the transaction.

15. A computer storage medium having computer-executable instructions stored thereon that, when executed by a processor, cause the processor to perform operations comprising:
detecting, by a computing device and via a point-of-sale module comprising a payment terminal, a user device in a proximity of the point-of-sale module;
in response to detecting the user device, obtaining, by the computing device and via the point-of-sale module, a unique identifier associated with the user device;
determining, by the computing device and based on input detected by the user device, that point-of sale preferences that are associated with the user device are to be used during a transaction; and
transmitting, by the computing device, the unique identifier to a point-of-sale customization service to obtain the point-of-sale preferences, wherein the point-of-sale preferences define a payment account that is to be used by the point-of-sale module for a payment during the transaction.

16. The computer storage medium of claim 15, wherein the point-of-sale preferences comprise:
a security preference that specifies an encryption technology to be used by the point-of-sale module for the transaction.

17. The computer storage medium of claim 15, wherein the computer-executable instructions, when executed by the processor, cause the processor to perform operations further comprising:
determining that the point-of-sale preferences associated with the user device were updated during the transaction; and
updating the point-of-sale preferences based upon a determined update to the point-of-sale preferences associated with the user device.

18. The computer storage medium of claim 15, wherein the point-of-sale preferences define the payment account based on a location associated with the transaction.

19. The computer storage medium of claim 15, wherein the point-of-sale preferences define the payment account based on a merchant associated with the transaction.

20. The computer storage medium of claim 15, wherein the input comprises selection of an option to use the point-of-sale preferences.

* * * * *